(12) United States Patent
Johnson et al.

(10) Patent No.: US 6,732,198 B1
(45) Date of Patent: May 4, 2004

(54) METHODS AND APPARATUS FOR SAVING AND RESTORING SCATTER/GATHER LIST PROCESSING CONTEXT IN INTELLIGENT CONTROLLERS

(75) Inventors: Stephen B. Johnson, Colorado Springs, CO (US); Timothy E. Hoglund, Colorado Springs, CO (US); Daniel E. Ballare, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 353 days.

(21) Appl. No.: 09/910,658

(22) Filed: Jul. 20, 2001

(51) Int. Cl.[7] .............................................. G06F 13/14
(52) U.S. Cl. ............................ 710/22; 710/20; 710/33; 710/26; 710/40; 709/103; 709/108
(58) Field of Search .......................... 710/22, 20, 100, 710/260, 40, 33; 709/108, 103

(56) References Cited

U.S. PATENT DOCUMENTS 6,298,403 B1 * 10/2001 Suri et al. ................... 710/100
6,449,709 B1 * 9/2002 Gates ......................... 712/202
6,578,096 B1 * 6/2003 Steinmetz et al. ........... 710/105
6,665,746 B1 * 12/2003 Liong ......................... 710/22

* cited by examiner

*Primary Examiner*—A. Elamin
(74) *Attorney, Agent, or Firm*—Duft Setter Ollila & Bornsen, LLC

(57) ABSTRACT

A circuit and associated methods of operation for a standardized scatter/gather list processor component within DMACs and intelligent IOPs. The standardized circuit architecture and methods provide a register interface and associated processing capabilities to simplify firmware processing to save and restore context information regarding block transfer operations that are paused and resumed prior to completion. Furthermore, the invention provides for architecture and associated methods for processing of standard scatter/gather list elements by a standardized scatter/gather list processor embedded within DMACs and IOPs. Specifically, as applied in the context of SCSI or Fiber Channel IOPs, the scatter/gather list processor of the present invention simplifies IOP firmware processing to save the current block transfer context on occurrence of a SCSI disconnect and to restore the saved context on occurrence of a SCSI reselect.

14 Claims, 4 Drawing Sheets

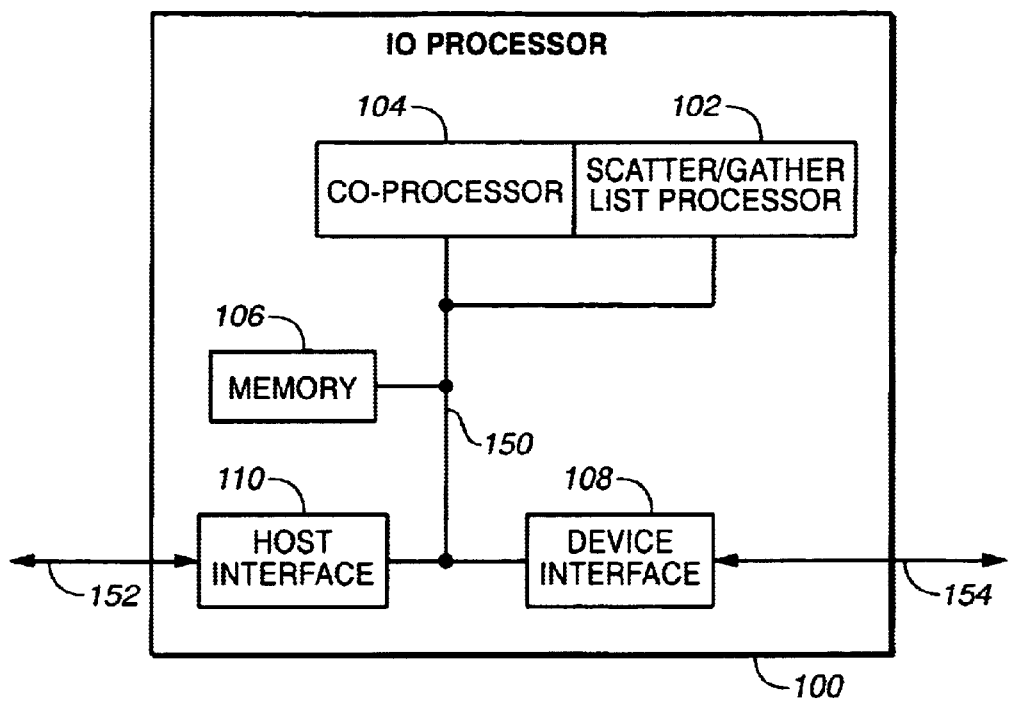
FIG._1
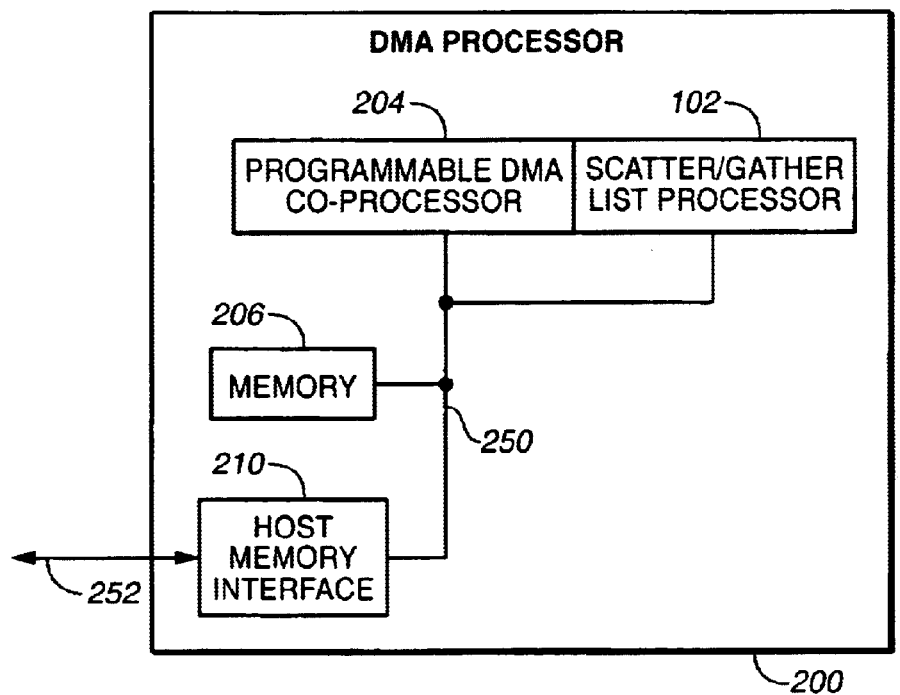
FIG._2

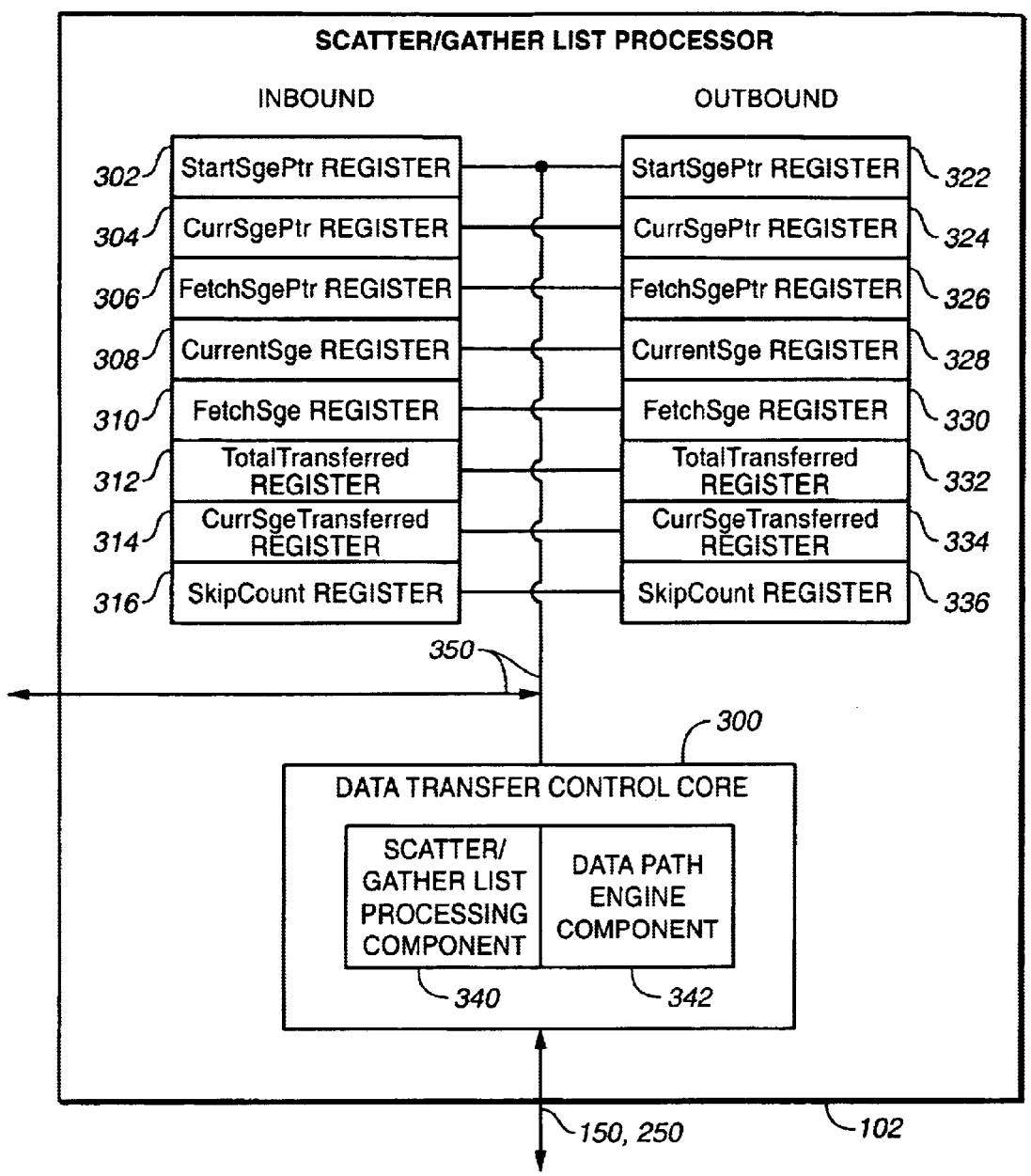
FIG._3

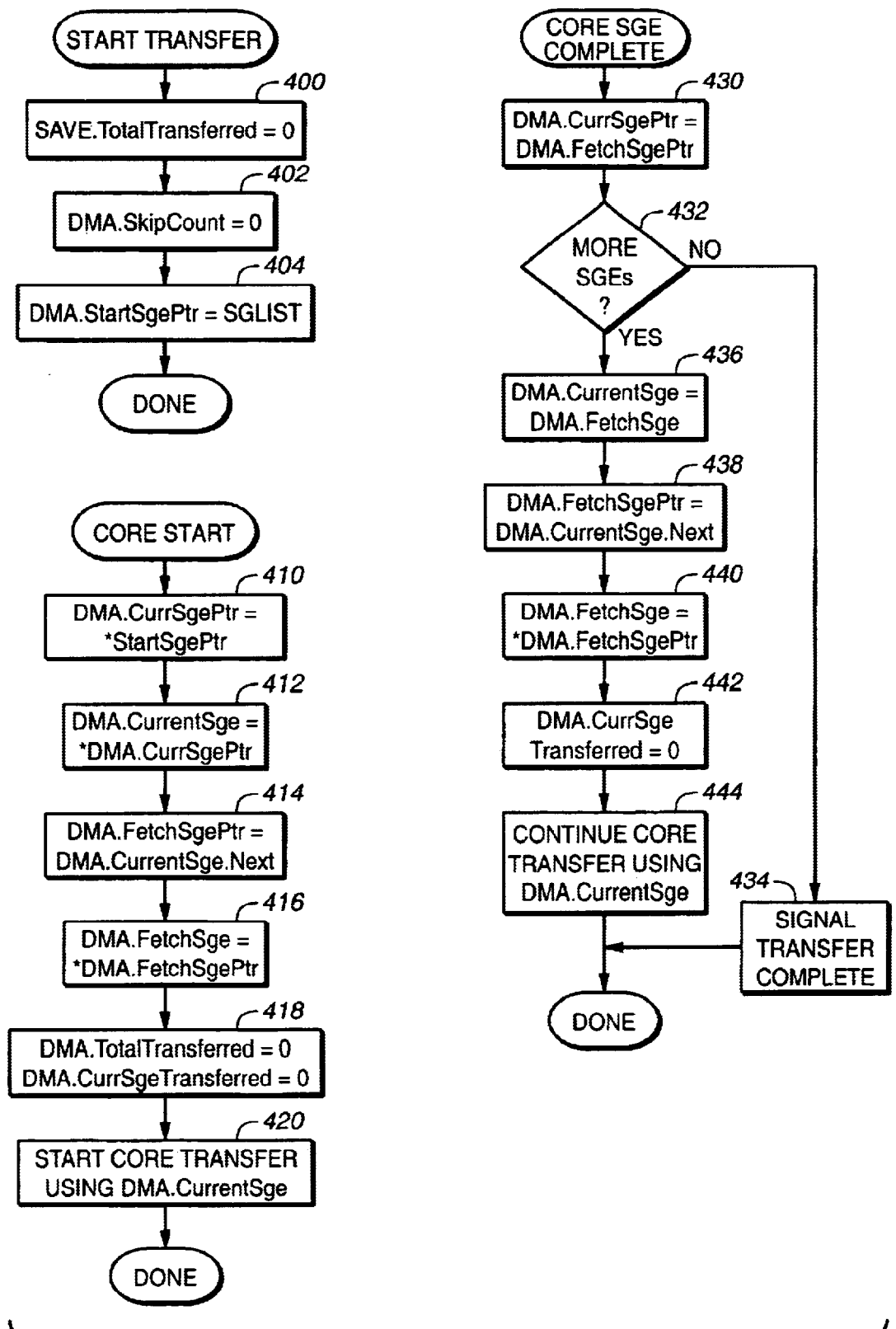
FIG._4

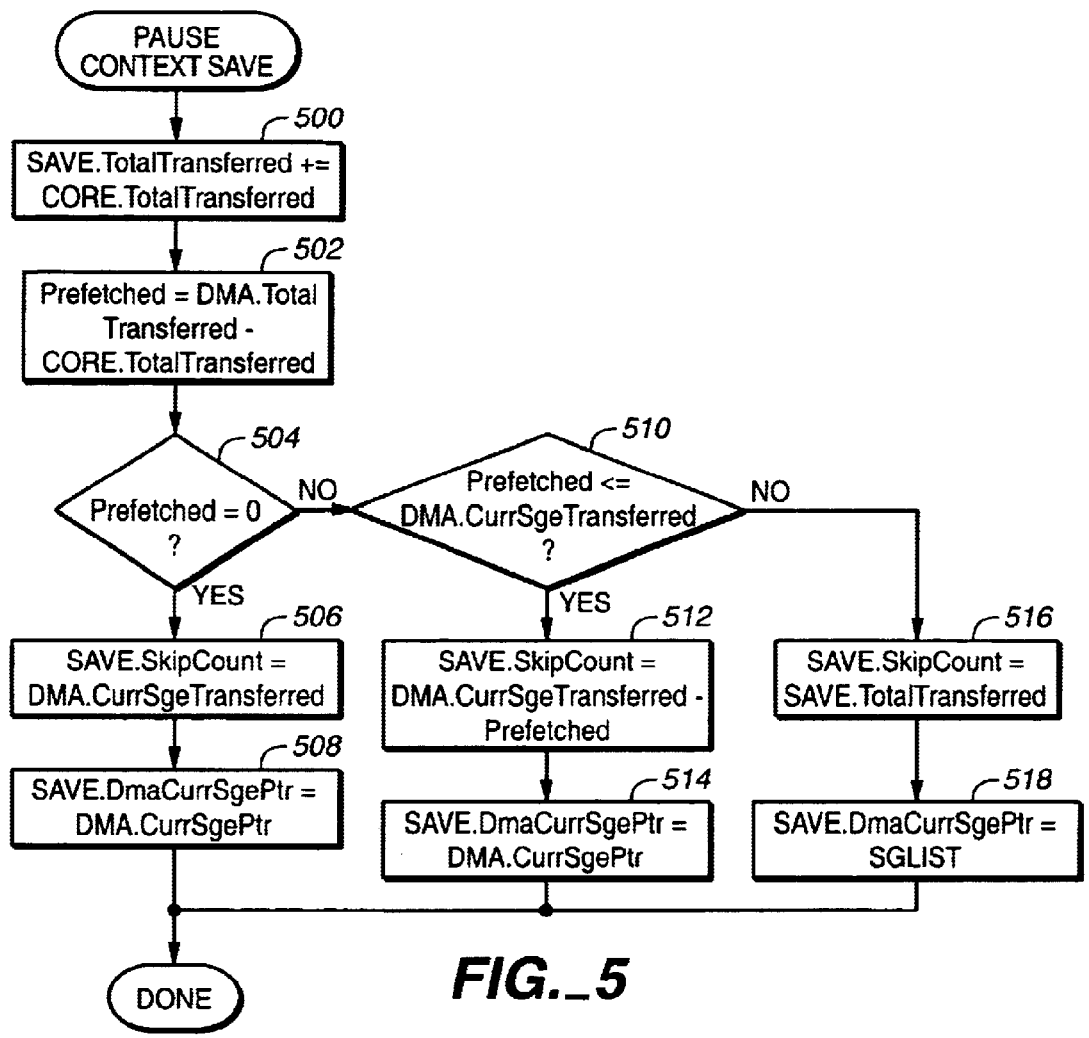
FIG._5
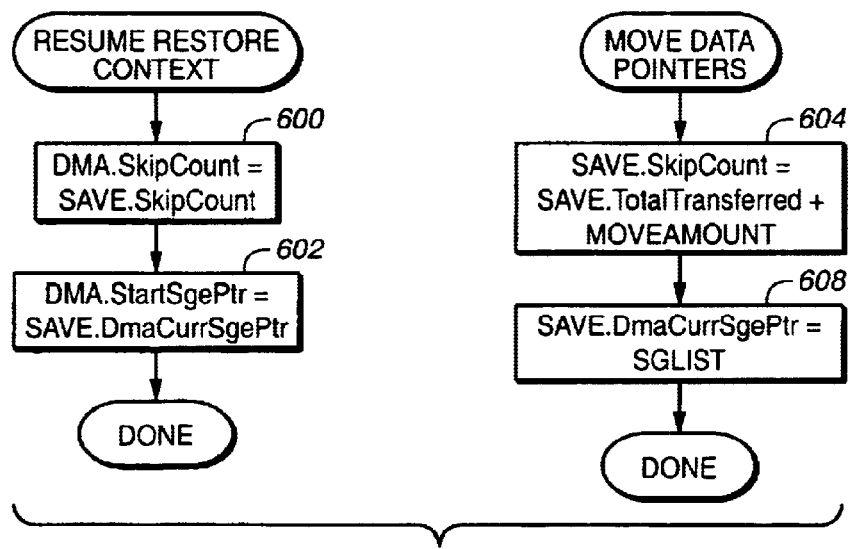
FIG._6

METHODS AND APPARATUS FOR SAVING AND RESTORING SCATTER/GATHER LIST PROCESSING CONTEXT IN INTELLIGENT CONTROLLERS

BACKGROUND OF THE INVENTION

1. Field of the Invention

The present invention relates to computing coprocessor architectures and more specifically relates to methods for saving and restoring context in I/O coprocessors utilizing scatter/gather lists for manipulating blocks of memory.

2. Discussion of Related Art

It is common in computing and electronic applications for a processor device to manipulate large blocks of memory for particular application purposes. For example, DMACs are often used in conjunction with general-purpose processors ("CPU") to handle movement of large blocks of data with minimal overhead processing by the general-purpose CPU. The DMAC is programmed by the CPU to indicate the block of memory to be manipulated including, for example, a source location, destination location, and count of the number of units of memory to be moved. The DMA controller then performs the requested block memory move operation without further intervention by the CPU. This generally frees the CPU computational power for processing of other operations for the particular application. When the DMA controller completes the block memory operation, it notifies the CPU of the completion and the CPU then continues processing as necessary following completion of the block memory operation.

It is also common for intelligent IOP devices to include similar block memory manipulation structures. For example, a SCSI bus controller or Fibre Channel controller may include programmable capabilities such that it directly manipulates blocks of memory to transfer information between the SCSI bus (or Fibre Channel medium) and the system memory of a host computer. Similar to the purpose of a DMAC, IOPs serve to offload the general-purpose CPU from the lower-level responsibilities of manipulating individual units of memory in the block memory operations. Rather, the DMAC or IOP is programmed to perform the particular block operation and interrupt or otherwise notify the general-purpose CPU when the block operation is completed.

It is common in the present day DMACs and IOPs to include a capability for processing multiple block memory operations under the programmable direction of an associated general-purpose CPU. Specifically, the general-purpose CPU may supply information to the DMAC or IOP to signify a plurality of memory blocks to be used in a plurality of block transfer operations. Frequently, a list of memory blocks to be manipulated is supplied to the DMAC or IOP by the general-purpose CPU. The list is often referred to as a scatter/gather list ("SGL"). The list may, for example, identify a plurality of blocks of memory to be "written" to one or more destination locations or may specify the "reading" of noncontiguous source locations of memory for transfer to one or more destination locations (i.e., the "scattering" or "gathering" of memory blocks).

The scatter/gather list may be specified utilizing any of a variety of well-known computing data structures to define a list of such elements for processing within the DMAC or IOP.

DMACs and IOPs that process scatter/gather lists generally embed significant processing power to perform their respective I/O processing functions and to process the scatter/gather lists. Such intelligent coprocessors (i.e., DMACs and IOPs) have programmed instructions operating within to perform the designated I/O operations and to process the scatter/gather lists. Processing of the scatter/gathers lists generally involves memory manipulations to fetch entries from the scatter/gather list and starting the block transfer operation defined by the fetched scatter/gather list entry. This processing is typically coded as "firmware" within the intelligent coprocessor.

As demands for additional I/O processing features within intelligent coprocessors increase to further offload processing within the general-purpose processor, processing requirements within the intelligent coprocessors similarly increases. In other words, the processing load is shifted from the general-purpose processor to the intelligent coprocessor. Processing capability within such intelligent coprocessor devices is becoming a valuable resource to be carefully allocated. Within present DMACs and IOPs, significant processing capabilities are now allocated to firmware for processing of scatter/gather list entries. In particular, scatter/gather list processing entails the fetching of scatter/gather list elements, parsing out of data values from each such fetched scatter/gather list elements, and following list data structure information to locate a next scatter/gather list element.

Further, processing of the block transfer operation defined by each individual scatter/gather list element may require a sequence of intermediate steps so that multiple block transfers may be processed in parallel within the DMAC or IOP. In other words, processing of one scatter/gather list element may be temporarily suspended while other block transfer operations defined by other scatter/gather list elements continue forward. Saving and restoring context information when such block transfer operations are paused and resumed can consume significant processing power of the intelligent coprocessor. Present techniques require that the IOP code ("firmware") expend significant processing power to traverse the scatter/gather list to locate and save needed context where the block transfer operations were paused and then to restore the scatter/gather list processing when the block transfer operation is to be resumed.

It is evident from the above discussion that a need exists for an improved architecture providing a standardized architecture and method for processing scatter/gather list within intelligent coprocessors. In particular a need exists to improve the processing of scatter/gather list processing where block transfers are paused and resumed.

SUMMARY OF THE INVENTION

The present invention solves the above and other problems, thereby advancing the state of the useful arts, by providing structure and associated methods for a standardized data path engine including scatter/gather list processing capabilities and for the saving and restoring of context information relating to scatter/gather list processing in using such a standardized data path engine. Specifically, the present invention defines a scatter/gather list circuit architecture and method of operation for integration within intelligent coprocessors. Still more specifically, the present invention provides a circuit architecture and associated methods for a standardized scatter/gather list processor element to be incorporated within intelligent coprocessors. The standardized architecture includes a register interface for both inbound and outbound transfer operations in the preferred embodiment to simplify context save and restore capabilities to pause a block transfer operation prior to completion.

A first aspect of the present invention provides for a method operable in an intelligent coprocessor having a scatter/gather list processor where the method comprises the steps of: pausing processing of a scatter/gather list by the scatter/gather list processor; reading current context regarding progress of processing of the scatter/gather list by the scatter/gather list processor, wherein the current context comprises values read from registers in the scatter/gather list processor; writing the current context to the registers to restore the current context in the scatter/gather list processor; and resuming processing of the scatter/gather list by the scatter/gather list processor.

A further aspect of the present invention provides for modifying the current context prior to writing where the modification is responsive to a Modify Data Pointers message.

Still another aspect of the present invention provides a scatter/gather list processor circuit for processing of a scatter/gather list within an intelligent coprocessor comprising: a current context memory containing information regarding processing of a scatter/gather element of the scatter/gather list wherein the current context memory provides a read/write interface to other elements of the intelligent coprocessor; and a control element coupled to the current context memory for processing of the scatter/gather list to perform block transfer operations defined by scatter/gather elements of the scatter/gather list.

Yet another aspect provides that the current context memory comprises a plurality of registers.

These and other features, aspects and benefits of the present invention will be readily apparent to those skilled in the art through a more careful reading of the following description and associated drawings as follows.

BRIEF DESCRIPTION OF THE DRAWINGS

FIG. 1 is a block diagram of an intelligent I/O coprocessor operable in accordance with the present invention to process scatter/gather lists.

FIG. 2 is a block diagram of an intelligent DMA coprocessor operable in accordance with the present invention to process scatter/gather lists.

FIG. 3 is a block diagram providing additional details of the scatter/gather list processor of FIGS. 1 and 2.

FIG. 4 provides multiple flowcharts describing methods of the present invention to initiate and complete processing in an intelligent coprocessor for a scatter/gather list.

FIG. 5 is a flowchart describing a method of the present invention to pause processing of the scatter/gather list processor of the present invention and to save context required to resume processing.

FIG. 6 provides multiple flowcharts describing methods of the present invention to resume previously paused scatter/gather list processing including restoration of saved context and a for modifying data pointers in a previously saved context to adjust the scatter/gather list processing.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a scatter/gather list processor 102 in accordance with the present invention embodied within an intelligent I/O coprocessor 100. I/O coprocessor ("IOP") 100 includes a specialized processor 104 tightly coupled to scatter/gather list processor 102 adapted to the particular I/O processing functions of IOP 100. As discussed further herein below, scatter/gather list processor 102 provides a register interface accessible to specialized processor 104 for purposes of controlling scatter/gather list processing. The register interface in accordance with the present invention simplifies the methods operable in specialized processor 104 for saving and restoring context information when pausing and resuming processing of a scatter/gather list. Processor 104 preferably executes programmed instructions residing in memory 106 and manipulates data structures also resident in memory 106. Scatter/gather list processor 102 preferably is a custom circuit that manipulates scatter/gather list structures in memory 106.

In the preferred embodiment, scatter/gather lists are stored in memory 106. Host interface 110 exchanges information between IOP 100 and an attached host system (not shown) via bus 152. Device interface 108 adapts signals as required to communicate directly to the I/O peripheral device controlled by IOP 100 via bus 154. Internal bus 150 couples the various components within IOP 100 for exchange of information among the components. A variety of bus structures useful in IOP 100 are well-known matters of design choice for those skilled in the art.

FIG. 2 is a block diagram of a second exemplary embodiment of scatter/gather list processor 102 embodied within a DMA coprocessor 200. Scatter/gather list processor 102 is tightly coupled to a programmable DMA processor 204. Both processors 204 and 102 are coupled via internal bus 250 to memory 206 and host memory interface 210. Host memory interface 210 is coupled to the host system bus 252 for exchanging of information with a host system memory (not shown). Programmable DMA processor 204 preferably executes instructions stored in memory 206 and manipulates data structures such as scatter/gather lists also stored in memory 206.

Those skilled in the art will recognize that FIGS. 1 and 2 are intended as high-level functional diagrams of key operational components within IOP 100 and DMA processor 200. Key elements of FIGS. 1 and 2 related to the present invention reside in the architecture of scatter/gather list processor 102 and methods (discussed below) operable within the processors for interfacing with scatter/gather list processor 102.

Further, processors 100 and 200 of FIGS. 1 and 2 are both coprocessors broadly referred to herein as "intelligent coprocessors." I/O processing and DMA transfer processing are merely two common examples of such intelligent coprocessors. The present invention is broadly applicable to any coprocessors that perform a block transfer operation between devices and/or memories utilizing scatter/gather list architectures for controlling the block move operations.

FIG. 3 is a block diagram providing additional details of the internal architecture of scatter/gather list processor 102 in accordance with the present invention. Broadly speaking, scatter/gather list processing techniques involve lists of scatter/gather elements where elements of the list may be linked through linked list structures. In general, each scatter/gather element ("SGE") defines parameters of a block move operation and/or provides linking information to other SGEs.

Basic scatter/gather list processing to link between elements and perform a block transfer operation defined in an element is preferably performed within data transfer control for 300. Data transfer control element 300 is representative of the circuits and logic that perform particular desired movements of block of data between a source and destination location. Element 300 also represents the circuits and logic that parse elements of a scatter/gather list to determine parameters of a particular requested block move operation.

In the preferred embodiment, element 300 is designed as two tightly coupled components: a scatter/gather list processing component 340 and a data path engine component 342. This division is principally a logical division in that the circuits are integrated as a single collection of circuits within element 300. They are distinct components in the functional sense that the scatter/gather list processing circuits and logic are operable substantially independent of the details relating to buses and data transfers on those buses. The scatter/gather list processing component 340 need not address such bus interaction issues. Conversely, data path engine component 342 is designed to handle exchanges of information over attached buses (i.e., 150 and 250) as appropriate to the particular application. Details of bus interactions such as burst mode operations and data prefetch operations are designed within data path engine component 342 substantially independent of scatter/gather list processing component 340. In particular, data path engine 342 is designed to take advantage of specific performance features of the various buses with which it interacts (such as burst mode operations, data pre-fetching, etc.). In this sense the data path engine 342 and scatter/gather list processing component 340 operate in an asynchronous, pipelined manner rather than of necessity in a lock-step mode of operation. Those skilled in the art will recognize that in the alternative the two components (340 and 342) may be tightly integrated within element 300 operating in a synchronized, lock-step manner where such independence of design and operation is not critical to the application.

Other details of the structure of data transfer control core element 300 are well-known matters of design choice to those skilled in the art and need not be further discussed here and.

Data transfer control core 300 preferably interacts with other elements in the intelligent coprocessor (100 and 200 of FIGS. 1 and 2, respectively) via bus 150 or 250 of FIGS. 1 and 2, respectively.

Key to the present invention is a register interface that exposes the list processing of the scatter/gather list processor 102 for manipulation by the tightly coupled processor (104 and 204 of FIGS. 1 and 2, respectively). In the preferred embodiment, the scatter/gather list processor 102 is capable of processing at least two simultaneous scatter/gather lists, namely: a list for an inbound transfer and a list for an outbound transfer. A set of registers 302 through 316 provides an interface for the inbound direction transfer and a parallel second set of registers 322 through 336 provides an interface for the outbound direction transfer.

In general, each set of registers includes a pointer register indicative of the start of the scatter/gather list presently being processed (302 and 322). A pair of registers in each set of registers provides a pointer to, and a copy of, the current SGE being processed (304, 308 and 324, 328). Progress in the transfer of information thus far in the current SGE is indicated by a transfer count register 314 and 334). A related pair of registers provides a pointer to, and a copy of, the next SGE fetched from the present scatter/gather list for processing following completion of the current SGE (306, 310 and 326, 330). Another count register (312, 332) tracks the total units of data transferred in processing thus far on all elements of the scatter/gather list. Lastly, a skip count register (316, 336) is used as discussed below to force the scatter/gather list processor 102 to skip past a number of data units when restarted after a pause.

Key to the present invention is exposure of the processing of the scatter/gather list processor through a register interface shown in FIG. 3. These registers dramatically simplify the methods operable in the tightly coupled coprocessor (i.e., 104 and 204 of FIGS. 1 and 2) for starting, stopping, pausing and resuming operation of the scatter/gather list processor. These simplified methods reduce complexity of instructions within the tightly coupled coprocessor related to saving and restoring context when pausing and resuming operation of the scatter/gather list coprocessor. This simplification serves to reduce overhead processing and improve performance in the intelligent coprocessor.

Methods operable within the intelligent coprocessor associated with the register interface described above are discussed herein below with respect to FIGS. 4 through 6. In particular, FIG. 4 provides flowcharts describing normal processing (uninterrupted from start to finish) of a scatter/gather list by the special purpose processor and scatter/gather list processor of the intelligent coprocessor.

The methods discussed below are presented as manipulating the registers and other variables as elements of a data structure. For simplicity of this discussion, there are presumed to be similar register structures used within the data transfer core control 300 of FIG. 3. Those skilled in the art will recognize that such a pseudo-code data structure is merely a useful tool for presenting and understanding the data elements in the data transfer core and scatter/gather list processing. Such a tool is often used in writing software/firmware to manipulate the hardware interface registers. The data structure for discussion purposes may be conceptually viewed in pseudo-code form as follows:

```
struct REGS {
    struct SGLIST *StartSgePtr;
    struct SGE *CurrSgePtr;
    struct SGE *FetchSgePtr;
    struct SGE CurrentSge;
    struct SGE FetchSge;
    uint TotalTransferred;
    uint CurrSgeTransferred;
    uint SkipCount
}
DMA, /* a register set of the scatter/gather list processor */
CORE; /* similar "registers" in the core regarding the */
      /* present block transfer */
```

As noted elsewhere herein, in a preferred embodiment, at least two sets of such registers would be available to define parallel operations of the data transfer and scatter/gather list processing for at least two simultaneous transfers. For example, there may be a first set of registers for an inbound direction of data transfer and a second set for an outbound direction of data transfer. Further, any number of such register sets may be provided in accordance with the block transfer operation requirements of a particular application of the present invention.

A key aspect of the present invention is reduction of the amount of data to be saved and restored in the pausing of the scatter/gather list block transfer operations and the later resumption thereof. For purposes of this discussion, the elements saved may be conceptually viewed in pseudo-code form as follows:

```
struct SAVED {
    struct SGE *DmaCurrSgePtr;
    uint TotalTransferred;
    uint SkipCount
}
SAVE; /* saved context for later restoration—typically */
      /* stored in a memory structure associated with */
      /* the special purpose processor */
```

Those skilled in the art will recognize that a variety of well-known design choices are available to implement the above stored information—both hardware and software/firmware structures. Such common design choices are readily recognized by those skilled in the art. The above structure is therefore not intended as limiting of the scope of the invention but rather is merely intended as exemplary or explanatory of the type of information presented by the register interface of the scatter/gather list processor of the present invention.

Element 400 is first operable to reset to the counter of total transferred information for the new block move request. For purposes of this presentation, the block move request is represented as the sequence of entries in the scatter/gather list. Element 402 is next operable to clear the skip counter register in the scatter/gather list processor register interface (316, 336). Element 404 then programs the start SGE pointer register (302, 322) for the scatter/gather list processor with the starting address of the scatter/gather list to be processed (a variable named SGLIST for this presentation). The scatter/gather list processor is then started to perform the block transfer operations defined by the scatter/gather list for the request.

The block transfer control core (300 of FIG. 3) then performs block transfer operations in accordance with the entries of the scatter/gather list. Further, the control circuits process the scatter/gather list entries to extract information describing each desired block transfer operations. The method represented by elements 410 through 420 describes the processing of the core control for initiating the block transfer operations in accordance with the first scatter/gather element of the scatter getter list provided to the scatter/gather list processor. Specifically, element 410 programs the current SGE pointer register (304, 324) with the first entry of the scatter/gather list. The first entry is pointed to by the start SGE pointer register value previously programmed as above at element 404. Element 412 programs the current SGE structure (308, 328) to copy the first SGE pointed to by the first entry on the scatter/gather list. Element 414 retrieves the next scatter/gather element pointed to by the next field of the current scatter/gather entry and stores the next pointer in the fetch SGE pointer register (306, 326). Element 416 retrieves the actual contents of the next scatter/gather element into the fetched SGE structure (310, 330). The current total transferred register (312, 332) and current SGE transferred register (314, 334) are reset to zero. Element 420 then commences operation of the data transfer core operations using the SGE entry presently programmed in the register set.

The method of elements 430 through 444 describes the processing for normal completion of one scatter/gather element in the scatter/gather list and the processing to continue to a next scatter/gather element in the list. Specifically, element 430 sets the current SGE pointer register with the previously retrieved fetched SGE pointer register value. Element 432 tests to determine whether there exists a next SGE entry to be processed. If not, processing completes at element 434 to signal completion of all block transfers defined by the scatter/gather list.

When element 432 determines that there is a next SGE entry to be processed, element 436 is then operable to copy the fetched SGE register content to the current SGE register. Element 438 then fetches the next SGE from the scatter/gather list using the "next" field of the current SGE. As noted above, scatter/gather list elements are presumed to include some indicia of a next field. The precise structure of the scatter/gather list is not relevant to the present invention. Any of several common structures for scatter/gather list elements may be used in conjunction with the present invention. Element 440 retrieves the fetch SGE structure pointed to by the fetch SGE pointer register. Element 442 then resets the current SGE transferred counter register to zero indicating the start of data transfer for the new SGE. Element 444 then continues the core data transfer processing to perform block data transfers in accordance with the current SGE register values.

Where a scatter/gather list is provided and performed to completion without errors and without need for interruption, the flowcharts of FIG. 4 described all essential processing related to the intelligent coprocessor operation to transfer block data. Those skilled in the art will readily recognize a variety of other details of operation well known to those ordinary skill the art and therefore not presented here. Further, those skilled in the art will readily recognize a variety of equivalent method steps to achieve the same purpose. Other equivalent method steps and variations of the order of the various steps present well-known design choices to those skilled in the art.

Further as noted above, the scatter/gather list processor may be designed as a single module that parses scatter/gather list elements and performs the block moves defined by those entries. In such a case the methods of FIG. 4 are all performed by such a single component processor. Where, in the alternative, the scatter/gather list processor is designed as a separate list processor component and data movement core component, the methods of FIG. 4 may be distributed among the components of the scatter/gather list processor. Such design choices are well-known to those skilled in the art.

It is common that a sequence of block moves defined by entries of a scatter/gather list may be interrupted prior to completion. For example, when moving data between a source and destination that have different performance levels (different data bandwidth capacity) the move operations may have to pause to wait for the source or destination to "catch up" with the other. For example, when moving blocks of data from a system memory source to a destination storage device (i.e., a SCSI disk storage device or a tape storage device), it is common to pause the operation to permit other block data exchanges to be performed while the slower destination "catches up" with the data movement. In SCSI terms this is often referred to as a "disconnect" and "reconnect" sequence. Such operations are referred to herein as pausing and restarting or resuming the block transfer operation.

When a sequence of block transfers defined by a scatter/gather list needs to be interrupted or paused prior to completion, the flowchart of FIG. 5 shows operations within the special purpose processor of the intelligent coprocessor to save required context for later restoration and resumption of the block transfer operations. Element 500 is first operable to save the total units of data transferred thus far in processing of the scatter/gather list by the core data path engine. In particular, element 500 adds to a cumulative total the present core total transferred counter. When the processing of the scatter/gather list is resumed, the core total transfer count will be reset to 0 and therefore this saved total transfer count needs to accumulate the partial transfer counts for each period of operation in processing the scatter/gather list between pauses and corresponding resumptions.

Element 502 is then operable to determine any adjustment necessary in the later resumption of the scatter/gather list processing for pipelined prefetching of data. In the best-known mode of practicing the invention, a core data path engine performs the actual data movements between source and destination locations for the defined block data transfer operations. This core data path engine is preferably operable independent of the scatter/gather list processing within the intelligent coprocessor. The asynchronous, independent nature of operation of these two components provides benefits in permitting flexibility in the design of circuits for low level data transfer operations independent of the scatter/gather list processing. Such independence permits use of data bursting and prefetch features available in various devices and buses without requiring changes to the independent scatter/gather list processing. Element 502 therefore determines the difference between the total units of data transferred by the scatter/gather list processing as compared to the total transfer count of the core data path engine. The number of units of data prefetched may be relevant to later restoration and resumption of the scatter/gather list processing.

Element 504 then determines if any units of data were prefetched. If so, element 506 and 508 are operable to save remaining context for potential later resumption and restoration of processing of the scatter/gather list. In particular, element 506 saves the transfer count associated with the current SGE being processed when the transfer was paused. This value is saved as a skip count used in later restoration to instruct the scatter/gather list processor and core data path engine to skip over the number of units of data previously transferred prior to the pausing of scatter/gather list processing. Element 508 is then operable to save the pointer to the current SGE being processed at the time of this pause.

If element 504 determines that the number of units of data prefetched is non-zero, element 510 is operable to determine whether the number of units of data prefetched is less than or equal to the number of units of data already transferred in processing of the current SGE. If so, element 512 and 514 are operable to save remaining context information in a manner analogous to that described above for element 506 and 508. Element 512 determines a skip count value as is done above with respect to element 506 but further adjusts the count value to account for pipeline prefetched units of data.

If element 510 determines that the number of units of data prefetched exceeds the number of units of data indicated as already transferred in the current SGE, and unrecoverable condition has arisen that would require backing up in the scatter/gather list to the previously processed SGE. For simplicity of design in the preferred embodiment, the scatter/gather list structure does not provide for the capability to locate the previous SGE in the scatter/gather list. Instead, for handling these rare occurrences, element 516 and 518 are operable to indicate a saved context that would restart processing and the beginning of the scatter/gather list. Specifically, element 516 sets the skip count value to the total units of data already transferred and the current SGE pointer value to the SGE at the start of the scatter/gather list. With these settings, resumption of the scatter/gather list processing and block transfer operations will skip forward through the scatter/gather list entries past the skip count number of units of data. Block data transfer will then continue after the skip count value is exhausted hence the transfer will continue where it left off.

Subsequent operations of the intelligent coprocessor preferably request restoration of the previously saved context and resumption of processing of the scatter/gather list to continue the block data transfer operations defined therein. FIG. 6 provides a first flowchart (elements 600 and 602) of the operations to restore such previously saved context and resume operation to process a scatter/gather list previously paused. In particular, element 600 is operable to set the skip count register of the scatter/gather list processor to the computed skip count saved in the earlier context save operation described above with respect to FIG. 5. As noted above, the skip count value instructs the scatter/gather list processor to skip transferring the number of units of data specified by the restored skip count register value. These bytes were previously transferred in earlier operation of the scatter/gather list processor (or requested to be skipped as discussed below). Element 602 then sets the start SGE pointer register to the previously saved SGE pointer value. The scatter/gather list processor and core data path engine then resume processing of the scatter/gather list in such a manner as to initialize processing as described above with respect to FIG. 4. Unlike the initial commencement of operations on a scatter/gather list, the resumption continues at some intermediate point in the scatter/gather list previously saved and when the operation was paused.

A second flowchart in FIG. 6 comprising elements 604 and 606 describes use of the present invention to process a SCSI Modify Data Pointers message. As known to those skilled in the art, a Modify Data Pointers message is sent by a SCSI target to the initiator to request that the current data pointers be moved (forward or backward depending on a movement amount parameter supplied in the message). Specifically, element 604 is operable to adjust the skip count for the upcoming resumption of operation to the total units of data already transferred plus the move amount specified as a parameter of the Modify Data Pointers message. Element 606 then sets the current SGE pointer for resumption of operations back to the start of the scatter/gather list presently being processed. On later resumption of the block transfer operations, the processing will resume at the beginning of he present scatter/gather list but skip to the point identified by the earlier Modify Data Pointers message.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In an intelligent coprocessor having a scatter/gather list processor, a method operable in said coprocessor comprising the steps of:

pausing processing of a scatter/gather list by said scatter/gather list processor;

reading current context regarding progress of processing of said scatter/gather list by said scatter/gather list processor, wherein said current context comprises values read from registers in said scatter/gather list processor wherein the current context includes a current scatter/gather element pointer register value and a transfer count register value;

writing said current context to said registers to restore said current context in said scatter/gather list processor; and resuming processing of said scatter/gather list by said scatter/gather list processor.

2. The method of claim 1 wherein the step of reading current context includes the steps of:

reading the current scatter/gather element pointer register value to determine the current scatter/gather element being processed in said scatter/gather list at the time processing was paused; and reading the transfer count register value to determine progress of processing by said scatter/gather list processor with respect to said scatter/gather list.

3. The method of claim 2 wherein the step of writing includes the steps of:

determining a skip value from the value read from said transfer count register; and writing said skip value to a skip count register such that when processing of said scatter/gather list is resumed previously transferred units of data will be skipped.

4. The method of claim 1 wherein said scatter/gather list processor comprises a scatter/gather list processing component and an asynchronously operable data path engine component and wherein the step of reading current context includes the steps of:

reading a first transfer count register to determine a first count value representing progress of processing of a current scatter/gather element of said scatter/gather list by said scatter/gather list processing component;

reading a second transfer count register to determine a second count value representing progress of processing said scatter/gather list by said data path engine component;

reading a third transfer count register to determine a third count value representing progress of processing said scatter/gather list by said scatter/gather list processing component;

determining a skip value from said first count value, from said second count value and from said third count value; and writing said skip value to a skip count register such that when processing of said scatter/gather list is resumed previously transferred units of data will be skipped.

5. The method of claim 4 wherein the step of determining includes the step of:

determining a prefetch adjustment value from said second count value and said third count value representing a number of units of data processed by said scatter/gather list processing component but not yet processed by said data path engine component; and determining said skip value from said first count value and from said prefetch adjustment value.

6. The method of claim 1 further comprising:

modifying said current context prior to the step of writing wherein the modification is responsive to a Modify Data Pointers message.

7. A scatter/gather list processor circuit for processing of a scatter/gather list within an intelligent coprocessor comprising:

a current context memory containing information regarding processing of a scatter/gather element of said scatter/gather list wherein said current context memory provides a read/write interface to other elements of said intelligent coprocessor and wherein the current context memory comprises a plurality of registers including a current scatter/gather element pointer register pointing to the current scatter/gather element being processed by said scatter/gather list processing and a current scatter/gather element transfer count register; and a control element coupled to said current context memory for processing of said scatter/gather list to perform block transfer operations defined by scatter/gather elements of said scatter/gather list.

8. The circuit of claim 7 wherein said control element further includes:

a scatter/gather list processing component for processing said scatter/gather list to extract information regarding block data transfers defined by scatter/gather elements in said scatter/gather list; and a data path engine element for controlling exchange of data over source and destination buses to perform block transfer operations defined by said scatter/gather list.

9. In an intelligent coprocessor having a scatter/gather list processor, a system comprising:

means for pausing processing of a scatter/gather list by said scatter/gather list processor;

means for reading current context regarding progress of processing of said scatter/gather list by said scatter/gather list processor, wherein said current context comprises values read from registers in said scatter/gather list processor and wherein the current context includes a current scatter/gather element pointer register value and a transfer count register value;

means for writing said current context to said registers to restore said current context in said scatter/gather list processor; and means for resuming processing of said scatter/gather list by said scatter/gather list processor.

10. The system of claim 9 wherein the means for reading current context includes:

means for reading the current scatter/gather element pointer register value to determine the current scatter/gather element being processed in said scatter/gather list at the time processing was paused; and means for reading the transfer count register value to determine progress of processing by said scatter/gather list processor with respect to said scatter/gather list.

11. The system of claim 10 wherein the means for writing includes:

means for determining a skip value from the value read from said transfer count register; and means for writing said skip value to a skip count register such that when processing of said scatter/gather list is resumed previously transferred units of data will be skipped.

12. The system of claim 9 wherein said scatter/gather list processor comprises:

a scatter/gather list processing component and an asynchronously operable data path engine component, and wherein the means for reading current context includes:

means for reading a first transfer count register to determine a first count value representing progress of processing of a current scatter/gather element of said scatter/gather list by said scatter/gather list processing component;

means for reading a second transfer count register to determine a second count value representing progress of processing said scatter/gather list by said data path engine component;

means for reading a third transfer count register to determine a third count value representing progress of processing said scatter/gather list by said scatter/gather list processing component;

means for determining a skip value from said first count value, from said second count value and from said third count value; and means for writing said skip value to a skip count register such that when processing of said scatter/gather list is resumed previously transferred units of data will be skipped.

13. The system of claim 12 wherein the means for determining includes:

means for determining a prefetch adjustment value from said second count value and said third count value representing a number of units of data processed by said scatter/gather list processing component but not yet processed by said data path engine component; and means for determining said skip value from said first count value and from said prefetch adjustment value.

14. The system of claim 9 further comprising:

means for modifying said current context prior to writing said current context wherein the modification is responsive to a Modify Data Pointers message.

\* \* \* \* \*